Feb. 16, 1954 V. O. SLETTEN ET AL 2,669,617
INDICATOR FOR PNEUMATIC TIRES
Filed June 22, 1950

Inventors
CHARLES C. BOWMAN
VERNON O. SLETTEN

By

UNITED STATES PATENT OFFICE 2,669,617

INDICATOR FOR PNEUMATIC TIRES

Vernon O. Sletten and Charles C. Bowman,
Havre, Mont.

Application June 22, 1950, Serial No. 169,663

5 Claims. (Cl. 200—61.25)

The present invention relates to an indicator for pneumatic tires, and more particularly has reference to an indicator assembly adapted to be installed within the valve stem of a tire for giving a visual or an audible signal to the driver of the vehicle when the tire air pressure reaches a predetermined point.

Viewing the invention broadly, it comprises locating a spring-controlled longitudinally slidable member within the valve stem, which member is connected with a circuit for a signal disposed within the vehicle such as a warning lamp on the dashboard, the slidable member normally maintaining the circuit to the lamp open when the tire pressure is above a predetermined point, but adapted to be moved to a circuit-making position to light the signal lamp when the tension of the spring means cooperating therewith is greater than the tire pressure.

The device is relatively simple in structural detail as well as operation and can be readily incorporated in conventional tires with little modification of the tire structure.

An important object of the present invention is to provide a warning signal for indicating to the driver of the vehicle that the tire pressure has fallen below a safe minimum pressure wherein the signal is instantly effected when the predetermined tire pressure has been reached.

Yet a further object of our invention is to provide a signalling device for pneumatic tires for indicating to the vehicle driver that the pressure has fallen to a predetermined pressure, which can be manufactured at a comparatively low cost and which by virtue of the relatively few essential parts presents no maintenance or repair problems.

With the foregoing and other objects in view, the invention consists in the details of construction, and in the arrangement and combination of parts to be hereinafter more fully set forth and claimed.

In describing the invention in detail, reference will be had to the accompanying drawings forming a part of this application wherein like characters denote corresponding parts in the several views, and in which.

Figure 1:
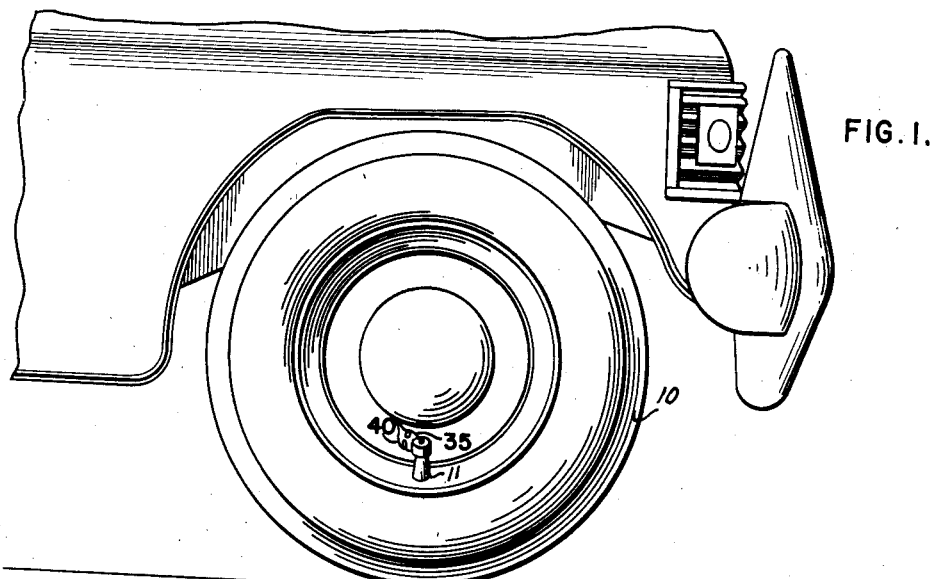
Figure 1 is a fragmental view in side elevation of a motor vehicle equipped with the indicator of the present invention.
Figure 2:
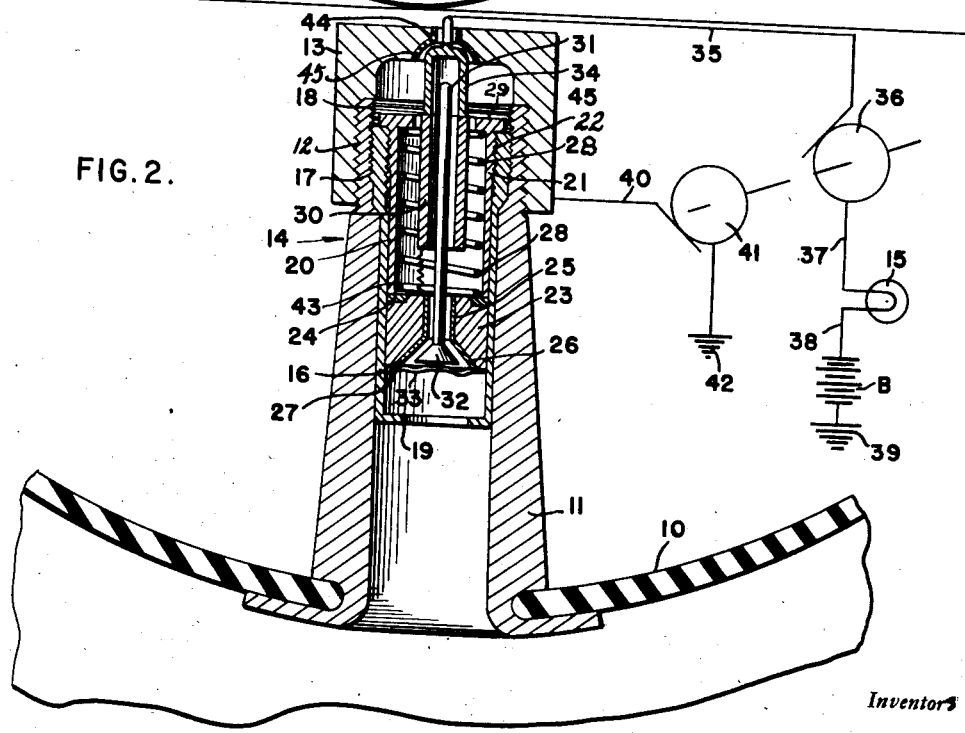
Figure 2 is a vertical sectional view of the valve stem of a tire equipped with the present signalling device.

As clearly illustrated in Figure 2, we have indicated the conventional tire 10, 11 is a valve stem externally threaded, as shown at 12, to receive a closure cap 13, and 14 denotes generally the control assembly for a signal lamp 15 located preferably on the dashboard of the vehicle.

The assembly 14 comprises a metallic conductor sleeve 16 which snugly fits within the valve stem 11, and the upper end of the sleeve 16 is externally threaded, as shown at 17, to engage internal threads 18 provided on the upper end of the valve stem 11, and the lower end of the sleeve 16 is formed with an internal annular flange 19 constituting a fixed contact which will later be more fully described. A metallic guide member 20 is disposed within the sleeve 16 and the upper end thereof is threaded, as indicated at 21, to engage corresponding threads 22 formed in the upper end of the sleeve 16. A piston 23 is disposed below the guide member 20 and the external diameter of the piston is slightly less than the internal diameter of the sleeve 16 so that the piston may have sliding movement longitudinally within the sleeve. The piston is formed of a suitable non-conductive material, and the upper face of the piston supports an annular gasket 24. The piston is formed with a vertical bore 25, the lower end of which merges with a conical recess 26 in the body of the piston, and both the bore 25 and the recess 26 are lined with a suitable conductive material 27 forming a movable contact.

A helical spring 28 is located within the guide member 20, and the upper end of the spring bears against an annular flange 29 integrally formed with the guide member, while the lower end of the spring bears against the gasket 24 and the head of the piston 23. The spring tends to urge the piston 23 downwardly, the downward movement of the piston being limited or arrested by the annular flange 19 formed on the lower end of the metal sleeve 16.

A metal guide tube 30 is mounted within the guide member 20 and an air release rod 31 provided with a valve 32 at the lower end thereof is disposed within the tube 30. A spring 33 is supported at the lower end of the piston 23 to restrain the downward movement of the rod 31 and the valve head 32. A conductor 34 is attached to the upper end of the tube 30 and is connected through a lead 35 with slip ring 36 located within the hub of the wheel. Lead 37 is connected with the lamp 15, while lead 38 connects the lamp with battery B which is grounded, as shown at 39. The cap 13 is connected by a conductor 40 with slip ring 41 which, in turn, is grounded, as shown at 42. Thus, lead 35 and conductor 40 are the conductor wires for the movable and the fixed contacts, respectively.

The tube 30 is connected with the metal line 27 by a conducting wire 43, and opening 44 in the upper wall of the cap 13 is insulated as indicated at 45.

As is apparent from Figure 2, the inflation path of the tire is from the upper end of such view to the tire, the path extending through the space between the flange of guide member 20 and the guide tube 30, through the spring chamber within the guide member, and into the axial opening in metal liner 25 in block 23 and the frusto-conical seat at the outlet end of such opening and with which the complemental end 32 of rod 31 cooperates, the path then extending through the axial opening in flange 19; since spring 33 overlies the latter opening to limit the movement of rod 31, the frusto-conical form of the liner opening outlet and the head of rod 31 provides the spread of the path so as to provide open communication in the path on opposite sides of spring 33 to insure free passage of the inflating air, while the pressure in the inflated tube has free access to hold the rod head to its seat, with the shape of the seat and inner side of the head insuring extended contact therebetween to prevent as far as possible leakage of air from the tube in the return direction, the relatively large dimensions of the outer face of the head affording ample area for making the tube pressure effective to hold the head tightly to its seat. While the open lower end of tube 30 is thus exposed to such path, it does not affect the inflating action since the tube is immovable and the closed end of the conductor 34 prevents any escape of air in the reverse direction.

Another advantage of the inflation path arranged in this way is the fact that it places practically the outer face of piston 23 exposed to the inflating pressure, thus adding this pressure to that of spring 28 to move the piston to its position of contact between the metal lining 26 and flange 19, the position which completes the circuit through the light, thus assuring that the light will remain lit until the counter-pressure is able to overcome the pressure of the spring plus the inflating pressure; since the spring in this position has its lowered pressure value—due to its expansion, this addition of the inflating pressure to maintain the circuit-closing position does not make an excessive pressure, but permits the building up of the tube pressure to the desired maximum value. As will be understood when during inflation, the opposing pressure values approach equilibrium, the gradual increase in pressure values within the tube finally overpowers the opposing pressure with the result that head 32 seats, and thus places the piston or block under the pressure within the tube, moving it away from flange 19 and breaking the circuit, this movement of the piston continuing until it again reaches contact with guide member 20, the power of spring 28 growing through the piston movement, to prevent too rapid movement of the piston as the seated head closes further admission of inflating air, and gradually sets the assembly and completes the cycle and sets the assembly to meet the conditions which serve to produce the succeeding cycle of operation.

Another advantage of the assembly is provided by the location and effect produced by air release rod or element 31 and its head 32 within the inflating path as above explained. The head in cooperation with liner 25 produces a valve effect within the path between the path entrance and the inner tube, with the head constantly exposed to the pressure within the tube, so that the valve effect is present at all times excepting during actual inflating action through the path—the inflating pressure necessarily exceeding the pressure within the tube to permit inflation, and hence, during periods when it is being applied will unseat the head to permit air introduction to the tube, the head instantly moving to seated position upon cessation of inflating, and remaining seated until the next inflating action is provided.

The rod or element 31 has no contact relation with spring 28 at any time the stem or rod being isolated from the spring by guide tube 30; hence, the spring has no effect on the valve, except to change its position in the path through the movement of the piston or block 23, such movement not affecting the seated condition of the valve—even in the circuit closing position of the piston and its liner in contact with internal flange 19 does not affect this condition. Hence, the valve effect remains active to tend to separate the path into a pair of sections, one of which extends from the entrance of the path to such valve with the other section directly communicating with the interior of the inner tube, the result being that the valve is always subject to the pressure within the inner tube due to this particular section, and without regard to the pressure conditions within the other section, excepting during actual inflating periods—there could be excessive slow leakage action within the latter section of the path and form a differential in pressure on opposite sides of the valve and in the two sections, the valve or seated head tending to reduce leakage conditions in the inner tube section of the path to a minimum. Because of this, there is less likelihood of damage arising through failure to respond immediately to the lighted signal, excepting in cases of blowout conditions in the tire.

The operation of the signal may be summarized as follows:

When the tire has been inflated to the desired pressure, the piston 23 will compress the spring 28 and the gasket 24 will be forced into tight engagement with the lower end of the guide member 20 and at the same time the valve head 32 will fit tightly against the walls of the conical recess 26, thereby providing a tight seal to prevent the escape of air from the tube. However, when the air pressure falls below the pressure of the spring 28, the spring will force the piston 23 downwardly until the metal liner 27 engages the flange 19 on the sleeves 16. Since the sleeve 16 is metal and is in direct contact with the cap 13, the sleeve is grounded through conductor 40, slip ring 41 and the ground 42 and a circuit is completed through liner 27, conducting wire 43, tube 30, conductor 34, lead 35, slip ring 36 to the light through the lead 38 to the battery B. Hence, the driver of the vehicle is given an instantaneous visual signal that the tire pressure has fallen below the desired pressure and should be checked.

The invention is not to be confined to any strict conformity with the showing in the drawing, but may be changed or modified so long as such changes or modifications mark no material departure from the salient features of the invention as expressed in the appended claims.

We claim:

1. In a pressure responsive switch for a tire deflation signal, a conductive sleeve located within the tire valve stem forming a fixed contact, a movable contact disposed within the sleeve and normally maintained out of circuit closure with the sleeve by the tire pressure, spring means cooperating with said movable contact tending to urge the movable contact into engagement with an internal flange within the sleeve, conducting wires for the fixed and movable contacts and complemental means on the sleeve and the valve stem to retain the sleeve and movable contact within the valve stem, the inflation path for the tire extending internally of the sleeve and through the movable contact and through an axial opening of the internal flange of the sleeve.

2. A pressure responsive switch as claimed in claim 1 wherein sleeve located within the valve stem is provided with an internal annular flange at the lower end thereof and the movable contact includes a block of non-conductive material slidably mounted within the sleeve, and a metal contact of annular type carried by the block is adapted to engage the annular flange of the sleeve to complete the circuit, said metal contact interior forming the inflation path section carried by the movable contact.

3. A pressure responsive switch as claimed in claim 2 wherein the said block is provided with a bore extending therethrough, and a metal liner in said bore, the metal liner constituting the block contact and being adapted to engage the annular flange of the sleeve to close the signalling circuit.

4. A pressure responsive switch as claimed in claim 3 wherein the lower end of the bore merges with a frusto-conical recess and an air release rod projects through the bore and terminates in a frusto-conical valve head, the taper of the valve head coinciding with the taper of the recess, said valve head constituting a controlling element in the tire inflation path.

5. A pressure responsive switch as claimed in claim 1 wherein a guide member is fixedly secured within the sleeve above the movable contact for supporting the spring means, said guide member forming a stop to limit the movement of the movable contact in one direction.

VERNON O. SLETTEN.
CHARLES C. BOWMAN.

References Cited in the file of this patent

UNITED STATES PATENTS

| Number | Name | Date |
|---|---|---|
| 1,183,486 | Pardue | May 16, 1916 |
| 1,410,297 | Harman | Mar. 21, 1922 |
| 1,975,639 | Greene | Oct. 2, 1934 |
| 2,445,959 | Luper | July 27, 1948 |